United States Patent
Im et al.

(10) Patent No.: US 9,732,811 B2
(45) Date of Patent: Aug. 15, 2017

(54) CARBON CERAMIC BRAKE DISC AND METHOD FOR MANUFACTURING THE SAME

(71) Applicant: DACC CARBON CO., LTD., Jeonju-si, Jeollabuk-do (KR)

(72) Inventors: Dong Won Im, Gimhae-si (KR); Yeon Ho Choi, Jeonju-si (KR); Kang Yoo, Jeonju-si (KR); Nam Cheol Lee, Jeonju-si (KR)

(73) Assignee: DACC CARBON CO., LTD., Jeonju-si, Jeollabuk-Do (KR)

( * ) Notice: Subject to any disclaimer, the term of this patent is extended or adjusted under 35 U.S.C. 154(b) by 0 days.

(21) Appl. No.: 14/995,908

(22) Filed: Jan. 14, 2016

(65) Prior Publication Data
US 2016/0333950 A1    Nov. 17, 2016

(30) Foreign Application Priority Data
May 12, 2015 (KR) .................. 10-2015-0065685

(51) Int. Cl.
*F16D 65/12* (2006.01)
*F16D 69/02* (2006.01)
(Continued)

(52) U.S. Cl.
CPC .......... *F16D 65/128* (2013.01); *C04B 35/573* (2013.01); *C04B 35/62204* (2013.01); *C04B 35/806* (2013.01); *F16D 65/12* (2013.01); *F16D 65/126* (2013.01); *F16D 69/023* (2013.01); *C04B 35/565* (2013.01); *C04B 35/80* (2013.01);
(Continued)

(58) Field of Classification Search
CPC ...... F16D 65/12; F16D 65/126; F16D 65/127; F16D 69/02; F16D 2065/132; F16D 2065/1316; F16D 2065/1328
USPC ................ 188/18 A, 218 XL, 218 R, 264 A, 188/264 AA
See application file for complete search history.

(56) References Cited

U.S. PATENT DOCUMENTS 5,372,222 A * 12/1994 Rhee ..................... F16D 65/125
                                                          188/218 XL
5,612,110 A *  3/1997 Watremez ............. F16D 65/123
                                                          188/251 R
(Continued)

FOREIGN PATENT DOCUMENTS

KR    2020100008536 A    2/2012
KR    1020120058004 A    6/2012
(Continued)

*Primary Examiner* — Christopher Schwartz
(74) *Attorney, Agent, or Firm* — Hauptman Han, LLP

(57) ABSTRACT

A carbon ceramic brake disc according to the present invention includes: a support body having cooling channels at the center portion; and friction layers directly attached to the top and the bottom of the support body without a bonding layer and having components different from the components of the support body, in which the support body is composed of a plurality of layers having components similar to the friction layers, gradually toward the friction layers from the cooling channels as the center.
Accordingly, the support body can perform thermomechanical shock absorbing that is an original function and the friction layers and the support body can be prevented from separating while the carbon ceramic brake disc is manufactured.

5 Claims, 8 Drawing Sheets

(51) Int. Cl.
*C04B 35/573* (2006.01)
*C04B 35/622* (2006.01)
*C04B 35/565* (2006.01)
*C04B 35/80* (2006.01)
*F16D 65/02* (2006.01)

(52) U.S. Cl.
CPC  *C04B 2235/3826* (2013.01); *C04B 2235/425* (2013.01); *C04B 2235/428* (2013.01); *C04B 2235/48* (2013.01); *C04B 2235/526* (2013.01); *C04B 2235/5248* (2013.01); *C04B 2235/5264* (2013.01); *C04B 2235/5272* (2013.01); *C04B 2235/612* (2013.01); *C04B 2235/616* (2013.01); *C04B 2235/721* (2013.01); *C04B 2235/80* (2013.01); *C04B 2235/83* (2013.01); *C04B 2237/363* (2013.01); *C04B 2237/365* (2013.01); *C04B 2237/38* (2013.01); *C04B 2237/385* (2013.01); *C04B 2237/582* (2013.01); *C04B 2237/61* (2013.01); *C04B 2237/62* (2013.01); *C04B 2237/70* (2013.01); *F16D 2065/132* (2013.01); *F16D 2065/1328* (2013.01); *F16D 2200/0047* (2013.01); *F16D 2250/0092* (2013.01)

(56) References Cited

U.S. PATENT DOCUMENTS

| | | | | |
|---|---|---|---|---|
| 7,445,095 B2* | 11/2008 | Bauer | .................. | C04B 35/521 |
| | | | | 188/218 XL |
| 2003/0146059 A1* | 8/2003 | Goller | .................... | F16D 65/12 |
| | | | | 188/218 XL |
| 2005/0183909 A1* | 8/2005 | Rau, III | .............. | F16D 65/0006 |
| | | | | 188/218 XL |
| 2008/0196986 A1* | 8/2008 | Meckel | .................. | C23C 14/022 |
| | | | | 188/218 XL |
| 2013/0048447 A1* | 2/2013 | Hanna | ..................... | F16D 65/12 |
| | | | | 188/218 XL |
| 2013/0075207 A1* | 3/2013 | Bruntz | ................... | B23P 15/00 |
| | | | | 188/218 XL |
| 2013/0180806 A1* | 7/2013 | Iwai | ...................... | F16D 65/125 |
| | | | | 188/26 |
| 2013/0284548 A1* | 10/2013 | Guether | ................. | B32B 18/00 |
| | | | | 188/218 XL |

FOREIGN PATENT DOCUMENTS

KR    101304188 B1    9/2013
KR    1020130120503 A    11/2013

* cited by examiner

CARBON CERAMIC BRAKE DISC AND METHOD FOR MANUFACTURING THE SAME

CROSS-REFERENCE TO RELATED APPLICATIONS

This application claims the priority of Korean Patent Application No. 10-2015-0065685 filed on May 12, 2015 in the Korean Intellectual Property Office, the disclosure of which is incorporated herein by reference.

BACKGROUND OF THE INVENTION

Field of the Invention

The present invention relates to a carbon ceramic brake disc.

Description of the Related Art

Brake discs are classified into a drum brake type and a disc brake type.

The disc brake type decelerates the speed of a vehicle or stops a vehicle by decelerating or stopping the rotation of a disc, using friction between a pad and the disc.

Recently, disc types of vehicle brake discs are made of a carbon fiber-reinforced ceramic composite.

The carbon fiber-reinforced ceramic composite is a material using ceramic as a matrix and reinforced with a carbon fiber. When a vehicle brake disc is made of a carbon fiber-reinforced ceramic composite, it is possible to manufacture a vehicle brake disc that is light and having high thermomechanical shock resistance, anti-oxidation, wear resistance, strength, and friction coefficient. A vehicle brake disc made of a carbon fiber-reinforced ceramic composite is called a "carbon ceramic brake disc".

A carbon ceramic brake disc is composed of a support body and friction layers bonded on and under the support body.

In Korean Patent No. 10-1304188 by the applicant, there is disclosed a method of manufacturing a carbon ceramic brake disc by forming a support body and friction layers, respectively, bonding carbonized support body and friction layers, and then infiltrating silicon into the bonded support body and friction layers.

Further, there is disclosed a method of making the components of the friction layer and the support body the same to prevent separation of the friction layer and the support body due to a large component difference between the friction layer and the support body in the process of manufacturing the carbon ceramic brake disc. When there is a large component difference between the friction layer and the support body, the difference of thermal expansion coefficients of the friction layer and the support body increases, so the friction layer and the support body may be easily separated.

On the other hand, when a brake is operated, the friction layer comes in frictional contact with a pad and the support body supports the friction layer, thereby absorbing thermomechanical shock. For this purpose, the friction layer needs excellent friction resistance and anti-oxidation and the support body needs excellent thermomechanical shock resistance. Therefore, the appropriate characteristics of the friction layer and the support body is important to improve the performance of a carbon ceramic brake disc.

However, as in the method disclosed in Korean Patent No. 10-1304188, the components of the support body and the friction layer are made the same to prevent separation of the friction layer and the support body, but in this case, the roles of the fiction layer and the support body cannot be appropriately divided. Accordingly, the performance of the carbon ceramic brake disc is deteriorated.

Further, according to the method disclosed in Korean Patent No. 10-1304188, the step of bonding the support body and the friction layer with an adhesive after making them, respectively, is necessary, so it is difficult to reduce the time for manufacturing a carbon ceramic brake disc.

SUMMARY OF THE INVENTION

An aspect of the present invention is to provide a carbon ceramic brake disc that can appropriately divide the roles of a friction layer and a support body and can prevent separation of the friction layer and the support body in the process of manufacturing a carbon ceramic brake disc, and a method of manufacturing the carbon ceramic brake disc.

Further, another aspect of the present invention is to reduce time for manufacturing a carbon ceramic brake disc by removing a step of bonding a friction layer and a support body.

According to an aspect of the present invention, there is provided a carbon ceramic brake disc according to the present invention includes: a support body having cooling channels at the center portion; and friction layers directly attached to the top and the bottom of the support body without a bonding layer and having components different from the components of the support body, in which the support body is composed of a plurality of layers having components similar to the components of the friction layers, gradually toward the friction layers from the cooling channels as the center.

According to another aspect of the present invention, there is provided a method of manufacturing the carbon ceramic brake disc, in which a friction layer mixture for making a friction layer is put into a mold, a support green body for making a support body is put on the friction layer mixture, a friction layer mixture for making the friction layer is put on the support green body, the support green body and friction layer green bodies combined with each other are obtained by pressing and heating the friction layer mixtures and the support green body with a press and a heater, a carbonized body is formed by carbonizing the combined support green body and the friction layer green bodies, and then a carbon fiber-reinforced ceramic composite is formed by infiltrating silicon into the carbonized body.

As described above, according to the present invention, the friction layers and the support body of the carbon ceramic brake disc have different components to divide the rolls. Accordingly, the friction layers have excellent friction resistance and anti-oxidation and the support body has excellent thermomechanical shock resistance.

The support body of the carbon ceramic brake disc of the present invention is composed of a plurality of layers having components that are gradually similar to those of the friction layers as it goes to the friction layers from the center of the cooling channels. Accordingly, the support body can perform thermomechanical shock absorbing that is an original function and the friction layers and the support body can be prevented from separating while the carbon ceramic brake disc is manufactured.

According to the method of manufacturing a carbon ceramic brake disc of the present invention, there is no step of bonding a friction layer and a support body, so it is possible to reduce the time for manufacturing the carbon ceramic brake disc.

According to the present invention, since the thickness of the friction layer can be adjusted by a mesh, it is possible to easily obtain a friction layer having a predetermined thickness.

According to the present invention, since a friction layer mixture is pressed between the bottom of a hard mold and the bottom of a hard support green body, it is possible to easily obtain a friction layer having a predetermined thickness.

According to the present invention, since a friction layer mixture is pressed between the bottom of a hard press and the top of a hard support green body, it is possible to easily obtain a friction layer having a predetermined thickness.

According to the present invention, the friction layer mixture may be composed of silicon powder, silicon carbide powder, graphite powder, and phenolic resin without carbon fibers. The silicon powder and the silicon carbide powder are obtained by crashing a wasted silicon wafer or a wasted solar cell plate. Accordingly, a wasted silicon wafer or a wasted solar cell plate is reused, so it is possible to reduce the manufacturing cost of the carbon ceramic brake disc.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, a carbon ceramic brake disc according to an embodiment of the present invention will be described in detail.

Figure 1:
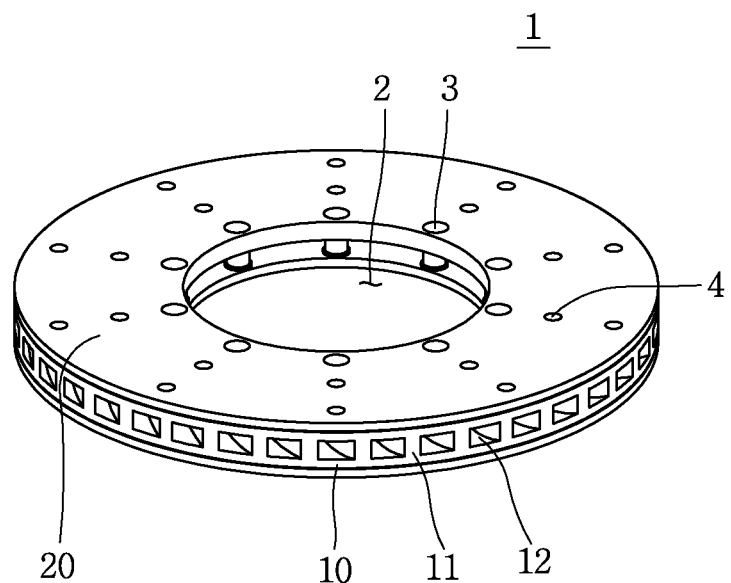
FIG. 1 is a view illustrating a carbon ceramic brake disc according to an embodiment of the present invention.

As illustrated in FIG. 1, a carbon ceramic brake disc 1 according to an embodiment of the present invention includes a support body 10 and friction layers 20. The friction layers 20 are directly attached to the top and bottom of the support body 10 without a bonding layer.

A shaft hole 2 through which an axle passes is formed at the center of the carbon ceramic brake disc 1. Through-holes 3 through which bolts are inserted to fasten a hat part are formed with regular intervals on the same circle around the shaft hole 2.

Cooling channels 12 are formed with regular intervals in the side of the carbon ceramic brake disc 1. The cooling channels 12 are separated by cooling channel walls 11.

Vertical pin holes 4 are formed through the top and the bottom of the carbon ceramic brake disc 1 to communicate with the cooling channels 12.

Figure 2:
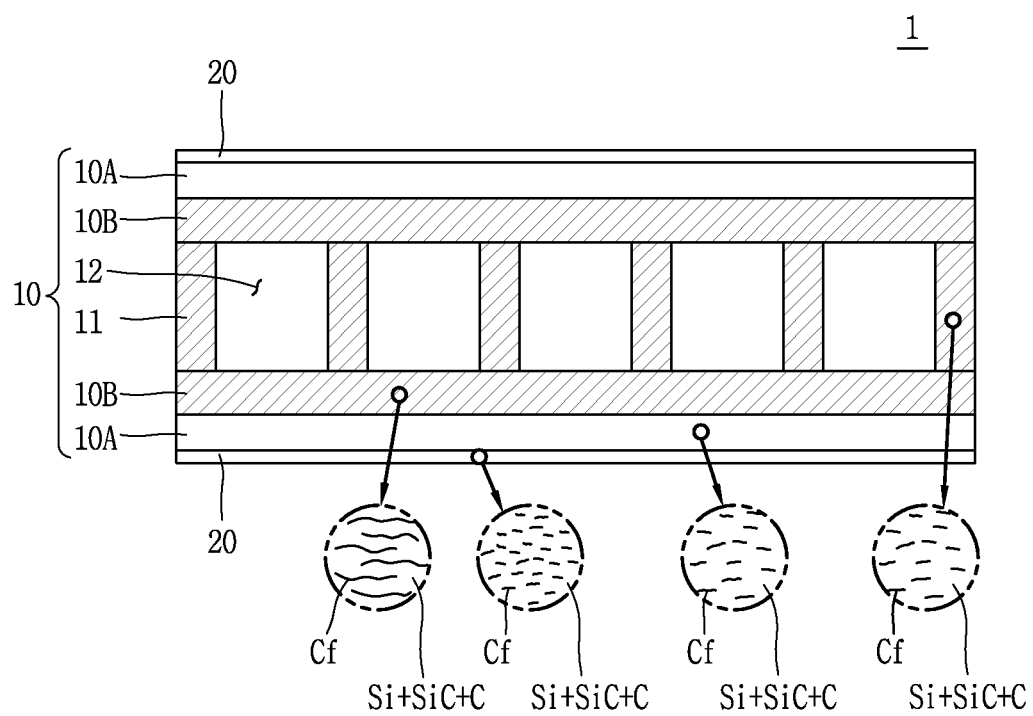
FIG. 2 is a vertical cross-sectional view of the carbon ceramic brake disc illustrated in FIG. 1.

Referring to FIG. 2, when a brake is operated, the friction layers 20 come in frictional contact with a pad and the support body 10 absorbs thermomechanical shock by supporting the friction layers 20. For this purpose, the friction layer 20 needs excellent friction resistances and anti-oxidation and the support body 10 needs excellent thermomechanical shock resistance. To this end, the friction layers 20 contain a higher amount of SiC than the support body 10.

The reason is that the more the SiC, the higher the friction coefficient and the harder the layer, and the lower the SiC, the lower the friction coefficient and the higher the thermomechanical shock resistance.

The support body 10 is composed of a plurality of layers having components similar to the components of the friction layers 20, gradually toward the friction layers 20 from the cooling channels 12 as the center.

In this embodiment, the support body 10 is composed of two layers. Obviously, the support body 10 may be composed of more layers.

The support body 10 is composed of a first support layer 10A and a second support layer 10B.

The first support layer 10A is disposed between the friction layers 20 and the second support layer 10B.

The first support layer 10A is directly attached to the friction layer 20 without a bonding layer.

The first support layer 10A is composed of SiC 64 to 60 wt %, Si 35 to 39 wt %, and C 1 wt % as a component. The thicknesses of the first support layer 10A is 10 mm. Obviously, the thicknesses of the first support layer 10A may be changed.

The second support layer 10B is disposed between the cooling channels 12 and the first support layer 10A. The second support layer 10B is composed of SiC 29 wt %, Si 7 wt %, and C 64 wt % as a component. The thicknesses of the second support layer 10B is 10 mm. Obviously, the thicknesses of the second layers 10B may be changed.

The cooling channel walls 11 are composed of SiC 29 wt %, Si 7 wt %, and C 64 wt % as a component. The thickness of the cooling channel walls 11 is 10 mm. Obviously, the thickness of the cooling channel walls 11 may be changed.

The friction layer 20 is composed of SiC 64 wt %, Si 35 wt %, and C 1 wt % as a component. The thicknesses of the friction layer 20 is 1 to 2 mm. Obviously, the thicknesses of the friction layer 20 may be changed.

Rather than the second support layer 10B, the first support layer 10A directly attached to the friction layer 20 contain components similar to those of the friction layer 20. In particular, SiC is more similar. Accordingly, it is possible to prevent separation of the friction layer 20 and the first support layer 10A in the process of manufacturing the carbon ceramic brake disc 1. Further, thermomechanical shock absorption, that is, an original role of the support body 10 can perform by the second support layer 10B.

If the support body 10 is composed of more layers, the components of the support bodies 10 directly attached to the friction layer can be more similar to those of the friction layer 20 even by changing the components of each layer of the support body 10 step by step.

Hereinafter, a method of manufacturing a carbon ceramic brake disc according to an embodiment of the present invention will be described in detail. FIGS. 1 and 2 will be basically referred.

First Step

A step of making a support green body.

Figure 3A:
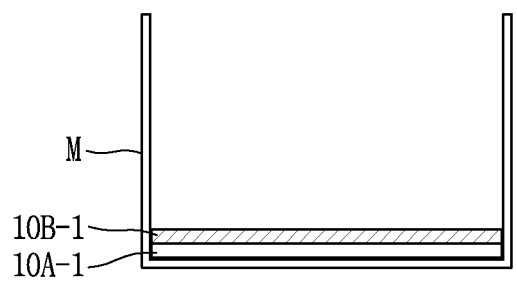
FIG. 3A is a view illustrating a state when a first support layer mixture and a second support layer mixture are sequentially put in a mold.
Figure 3B:
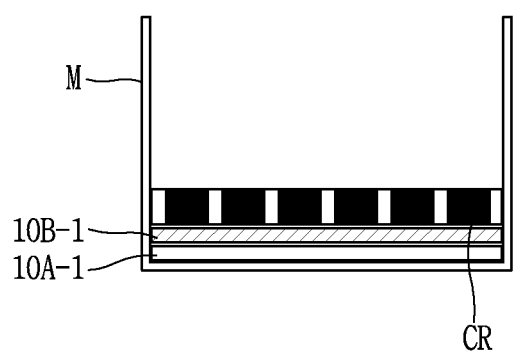
FIG. 3B is a view illustrating a state when a core for forming cooling channels is put on the second support layer mixture illustrated in FIG. 3A and gaps of the core are filled with a cooling channel wall mixture.
Figure 3C:
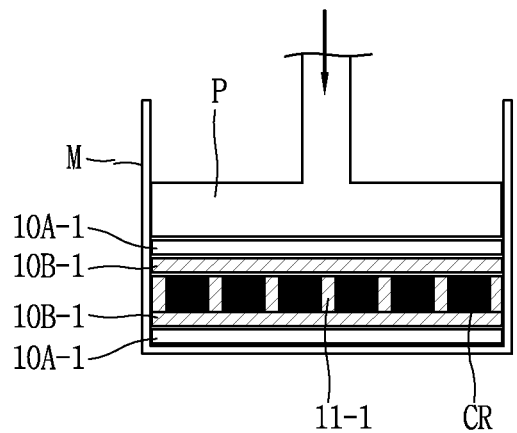
FIG. 3C is a view illustrating a state when a second support layer mixture and a first support layer mixture are sequentially put on the core illustrated in FIG. 3B and are pressed with a press to manufacture a support green body.

The straight arrow illustrated in FIG. 3C indicates a movement direction of a press. The curved arrow illustrated in FIG. 3D indicates a taking-out direction of the support green body.

As illustrated in FIG. 3A, a first support layer mixture 10A-1 and a second support layer mixture 10B-1 are sequentially put into a mold M.

The first support layer mixture 10A-1 becomes the first support layer 10A through carbonizing and silicon infiltrating and the second support layer mixture 10B-1 becomes the second support layer 10B through carbonizing and silicon infiltrating.

The first support layer mixture 10A-1 is composed of carbon fibers (the length of 4 to 7 mm) and phenolic resin.

The second support layer mixture 10B-1 is composed of carbon fibers (the length of 10 to 29 mm) and phenolic resin.

The more the short carbon fibers are included, the higher the area reacting with silicon, so more SiC is produced. The more the SiC is produced, the more the component is similar to those of the friction layers 20. Accordingly, the first support layer mixture 10A-1 directly attached to the friction layer 20 includes more short carbon fibers than the second support layer mixture 10B-1.

As illustrated in FIG. 3B, a core CR for forming the cooling channels 12 is put on the second support layer mixture 10B-1 and the gaps in the core CR is filled with a cooling channel wall mixture 11-1. The core CR is thermally decomposed in carbonizing. The core CR is made of polycarbonate, ABS resin (Acrylonitrile Butadiene Styrene copolymer), styrene resin, polyethylene, and acrylic resin. The cooling channels 12 are formed at the places left after the core CR is thermally decomposed and the cooling channel wall mixture 11-1 filled in the gaps of the core CR becomes the cooling channel walls 11. The cooling channel wall mixture 11-1 is composed of carbon fibers (the length of 10 to 29 mm) and phenolic resin. The strength of the cooling channels 12 is reinforced by the carbon fibers included in the cooling channel walls 11.

As illustrated in FIG. 3C, the second support layer mixture 10B-1 and the first support layer mixture 10A-1 are sequentially put on the core CR, and then, they are pressed with a press P and heated with a heater (not illustrated). Accordingly, a hard support green body 10C is made. The hard support green body 10C is defined as a support green body 10C in which the phenolic resin included in the first support layer mixture 10A-1, the second support layer mixture 10B-1, and the cooling channel wall mixture 11-1 is not completely hardened, but that is sufficiently hardened to maintain the shape.

Figure 3D:
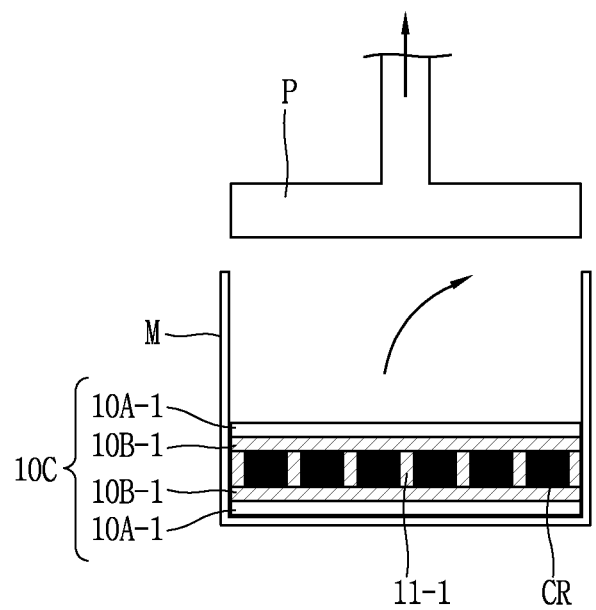
FIG. 3D is a view illustrating a state when the support green body is taken out of the mold.

As illustrated in FIG. 3D, the support green body 10C is taken out of the mold M.

Second Step

A step of making a friction layer green body and directly combining the friction layer green body and the support green body without a bonding layer.

Figure 4A:
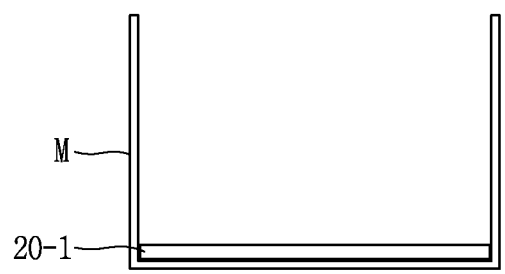
FIG. 4A is a view illustrating a state when a friction layer mixture is put in a mold.
Figure 4B:
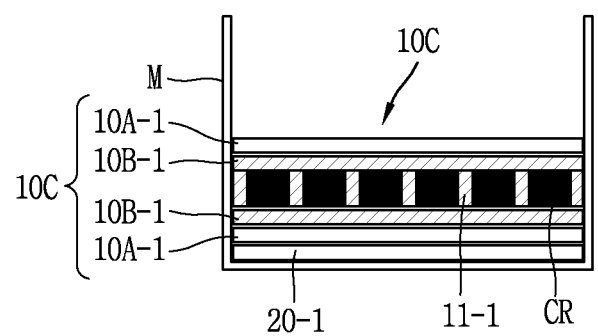
FIG. 4B is a view illustrating a state when the support green body illustrated in FIG. 3D is put on the friction layer mixture illustrated in FIG. 4A.
Figure 4C:
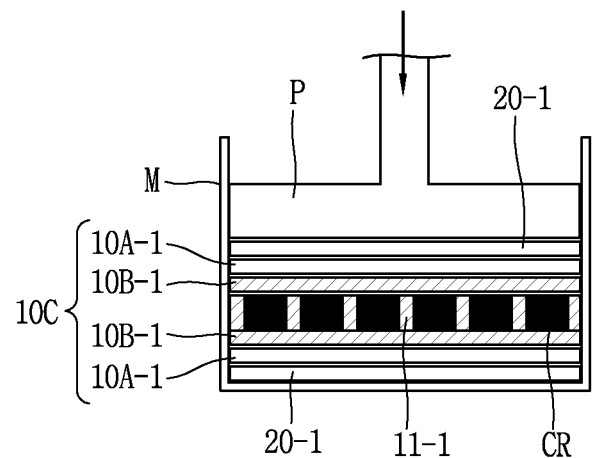
FIG. 4C is a view illustrating a state when a friction layer mixture is put on the support green body illustrated in FIG. 4B and they are pressed with a press to manufacture friction layer green bodies and directly combine the friction layer green bodies with the support green body.

The straight arrow illustrated in FIG. 4C indicates a movement direction of a press. The curved arrow illustrated in FIG. 4D indicates a taking-out direction of the combined support green body and the friction layer green bodies.

As illustrated in FIG. 4A, a friction layer mixture 20-1 is put into a mold M.

The friction layer mixture 20-1 is composed of carbon fibers (the length of 0.15 to 0.2 mm) and phenolic resin.

Meanwhile, the friction layer mixture 20-1 may be composed of silicon powder, silicon carbide powder, graphite powder, and phenolic resin without carbon fibers. The silicon powder and the silicon carbide powder may be obtained by crashing a wasted silicon wafer or a wasted solar cell plate.

As illustrated in FIG. 4B, the support green body 10C is put on the friction layer mixture 20-1.

Figure 4D:
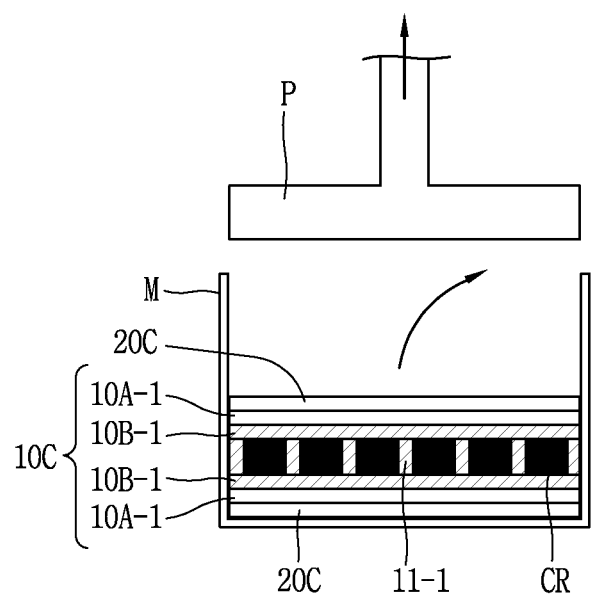
FIG. 4D is a view illustrating a state when the combined support green body and the friction layer green bodies are taken out of the mold.

As illustrated in FIG. 4C, a friction layer mixture 20-1 is put on the support green body 10C, and then, they are pressed with a press P and heated with a heater (not illustrated). As illustrated in FIG. 4D, friction layer green bodies 20C are made, and the support green body 10C and the friction layer green bodies 20C are directly combined with each other. the combined support green body 10C and the friction layer green bodies 20C are taken out of the mold M.

Obviously, a green body may be formed by putting not the hard support green body 10C, but a support body mixture on the friction layer mixture. In this case, the friction layer mixture and the support body mixture may be mixed each other, so it is very difficult to adjust the thickness of the friction layer 20.

However, according to the present invention, the friction layer mixture 20-1 is pressed between the bottom of the hard mold and the bottom of the hard support green body 10C, so it is possible to easily obtain a friction layer 20 having a predetermined thickness.

Further, according to the present invention, the friction layer mixture 20-1 is pressed between the bottom of the hard press P and the top of the hard support green body 10C, so it is possible to easily obtain a friction layer 20 having a predetermined thickness.

Figure 5A:
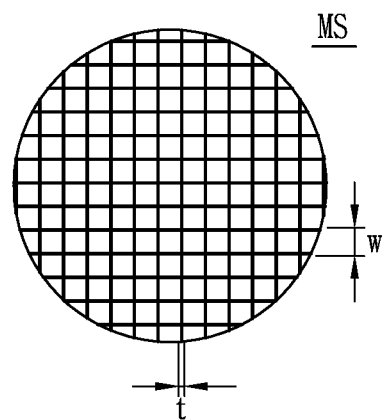
FIG. 5A is a plan view of a mesh for adjusting the height of a friction layer.
Figure 5B:
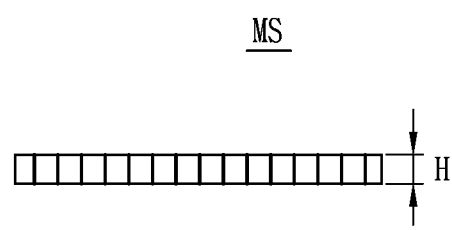
FIG. 5B is a side view of the mesh for adjusting the height of a friction layer.

In order to accurately adjust the height of the friction layer 20, a mesh MS illustrated in FIGS. 5A and 5B may be used.

The mesh MS is thermally decomposed in carbonizing. The mesh is made of polycarbonate, ABS resin (Acrylonitrile Butadiene Styrene copolymer), styrene resin, polyethylene, and acrylic resin.

The thicknesses t of the wires of the mesh MS are 0.1 to 0.5 mm. The widths W of the holes of the mesh MS are 1 to 10 mm.

Figure 6A:
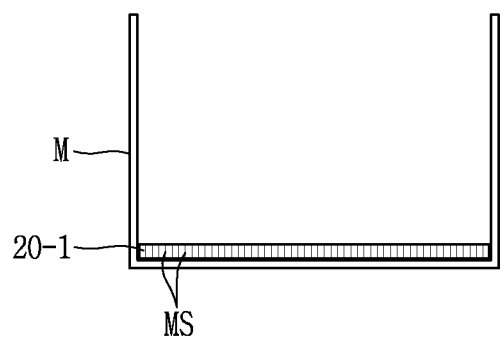
FIG. 6A is a view illustrating a state when a mesh is put in a mold and the mesh holes are filled with a friction layer mixture.
Figure 6B:
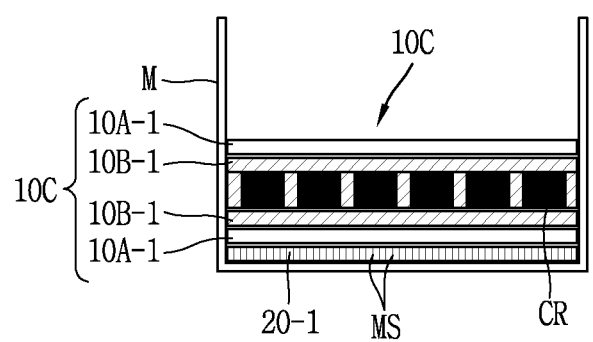
FIG. 6B is a view illustrating a state when the support green body illustrated in FIG. 3D is put on the mesh illustrated in FIG. 6A.
Figure 6C:
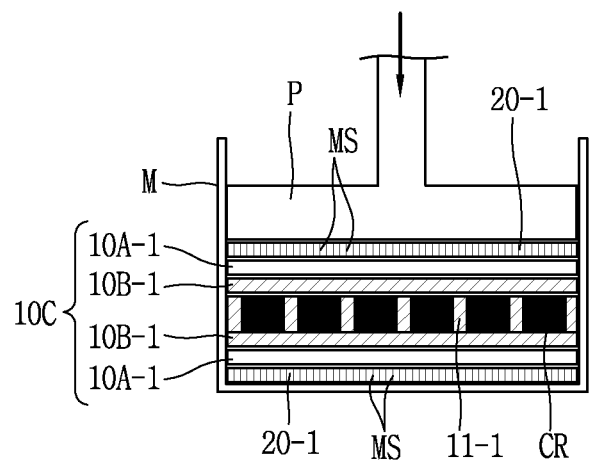
FIG. 6C is a view illustrating a state when a mesh is put on the support green body illustrated in FIG. 6B, the mesh holes are filled with a friction layer mixture, and they are pressed with a press to manufacture friction layer green bodies and directly combine the friction layer green bodies with the support green body.

The straight arrow illustrated in FIG. 6C indicates a movement direction of a press. The curved arrow illustrated in FIG. 6D indicates a taking-out direction of the support green body.

As illustrated in FIG. 6A, the mesh MS is put into a mold M and the mesh holes are filled with a friction layer mixture 20-1. The thickness of the friction layer 20 is adjusted by the thickness H of the mesh MS by filling the mesh holes with the friction layer mixture 20-1. Accordingly, it is possible to adjust the thickness of the friction layer accurately to a desired thickness.

Figure 6D:
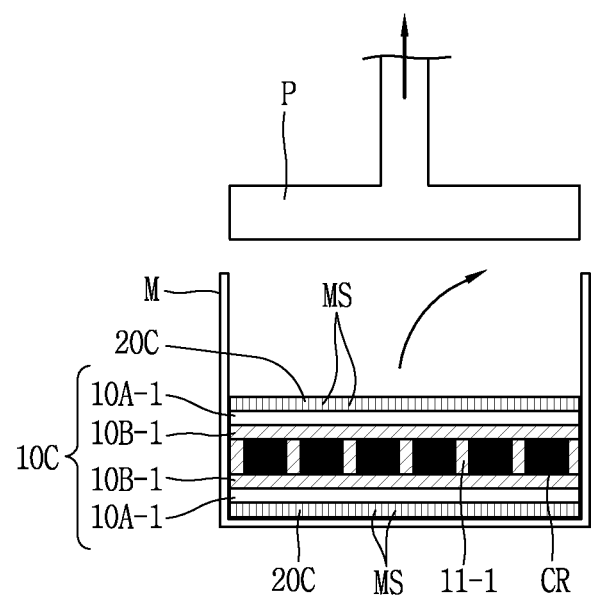
FIG. 6D is a view illustrating a state when the combined support green body and the friction layer green bodies are taken out of the mold.

As illustrated in FIG. 6B, a support green body 10C is put on the mesh MS. As illustrated in FIG. 6C, a mesh MS is put on the support green body 10C, the mesh holes are filled with a friction layer mixture 20-1, and then they are pressed with a press P and heated with a heater (not illustrated). As illustrated in FIG. 6D, friction layer green bodies 20C are made, and the support green body 10C and the friction layer green bodies 20C are directly combined with each other. the combined support green body 10C and the friction layer green bodies 20C are taken out of the mold M.

Third Step

A step of making a carbonized body by carbonizing the combined support green body 10c and the friction layer green bodies 20c.

The combined support green body 10C and the friction layer green bodies 20C are put into a vacuum resistance heating furnace (not illustrated). A vacuum atmosphere or an inert atmosphere has been made in the vacuum resistance heating furnace. The combined support green body 10C and the friction layer green bodies 20C are carbonized by increasing temperature up to 1000° C. in the vacuum resistance heating furnace. While the combined support green body 10C and the friction layer green bodies 20C are carbonized, the phenolic resin included in the combined support green body 10C and the friction layer green bodies 20C is thermally decomposed into carbon. Pores are formed at the portions left after the phenolic resin is thermally decomposed. The cooling channels 12 are formed at the place left after the core CR is thermally decomposed. As the combined support green body 10C and the friction layer green bodies 20C are carbonized, a carbonized body is produced.

Fourth Step

A step of machining a carbonized body.

Referring to FIG. 1, a shaft hole 2 through which an axle passes is formed at the center of the carbonized body. Through-holes 3 through which bolts are inserted to fasten a hat part are formed with regular intervals on the same circle around the shaft hole 2. The hat part is fastened to a wheel. Vertical pin holes 4 are formed with regular intervals through the top and the bottom of the carbonized body to communicate with the cooling channels 12.

Fifth Step

A step of infiltrating by melting silicon powder into the machined carbonized body.

The silicon powder is put into a container (not illustrated). The machined carbonized body is buried in the silicon powder. The container is put into a vacuum resistance heating furnace (not illustrated). The temperature of the container is increased up to 1550° C. in the vacuum resistance heating furnace. As the silicon powder melts, it is infiltrated into the machined carbonized body. The silicon powder becomes a silicon carbide (SiC) by reacting with the carbon component in the machined carbonized body. As the silicon powder is infiltrated into the machined carbonized body, a carbon fiber-reinforced ceramic composite is obtained.

Finally, the carbon ceramic brake disc 1 is achieved by grinding the carbon fiber-reinforced ceramic composite with a grinder.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a carbon ceramic brake disc, the method comprising:
   putting a friction layer mixture for making a friction layer, into a mold;
   putting a hard support green body for making a support body on the friction layer mixture;
   putting the friction layer mixture on the hard support green body;
   obtaining the hard support green body and friction layer green bodies combined with each other by pressing and heating the friction layer mixtures and the hard support green body with a press and a heater;
   forming a carbonized body by carbonizing the combined hard support green body and the friction layer green bodies; and
   forming a carbon fiber-reinforced ceramic composite by infiltrating silicon into the carbonized body,
   wherein a first support layer mixture is put into a mold,
      a second support layer mixture is put on the first support layer mixture,
      a core is put on the second support layer mixture,
      gaps in the core are filled with a cooling channel wall mixture,
      the second support layer mixture is put on the core,
      the first support layer mixture is put on the second support layer mixture put on the core, and
      the hard support green body is formed by pressing and heating the first support layer mixture and the second support layer mixture with a press and a heater, and
   wherein a mesh for adjusting the height of the friction layer is put into a mold before a friction layer mixture for making the friction layer is put into the mold, and
   the mesh for adjusting the height of the friction layer is put on the hard support green body before a friction layer mixture for making a friction layer is put on the hard support green body.

2. The method of claim 1, wherein the friction layer mixture is composed of silicon powder, silicon carbide powder, graphite powder, and phenolic resin without carbon fibers,
- the first support layer mixture is composed of carbon fibers (the length of 4 to 7 mm) and phenolic resin,
- the second support layer mixture is composed of carbon fibers (the length of 10 to 29 mm) and phenolic resin, and
- the cooling channel wall mixture is composed of carbon fibers (the length of 10 to 29 mm) and phenolic resin.

3. The method of claim 2, wherein the silicon powder and the silicon carbide powder are obtained by crashing a wasted silicon wafer or a wasted solar cell plate.

4. The method of claim 1, wherein the friction layer mixture is composed of carbon fibers (the length of 0.15 to 0.2 mm) and phenolic resin, or silicon powder and phenolic resin, or silicon carbide powder and phenolic resin, or graphite powder and phenolic resin, the first support layer mixture is composed of carbon fibers (the length of 4 to 7 mm) and phenolic resin,
- the second support layer mixture is composed of carbon fibers (the length of 10 to 29 mm) and phenolic resin, and
- the cooling channel wall mixture is composed of carbon fibers (the length of 10 to 29 mm) and phenolic resin.

5. The method of claim 1, wherein the mesh is made of polycarbonate, ABS resin (Acrylonitrile Butadiene Styrene copolymer), styrene resin, polyethylene, and acrylic resin, the thicknesses of the wires of the mesh are 0.1 to 0.5 mm, and the widths of the holes of the mesh are 1 to 10 mm.

* * * * *